United States Patent [19]

Kalafus et al.

[11] 4,134,869

[45] Jan. 16, 1979

[54] VINYL PYRIDINE LATEX STABILIZED WITH A RESORCINOL-FORMALDEHYDE NOVOLAK

[75] Inventors: Edward F. Kalafus, Akron; Satish C. Sharma, Mogadore, both of Ohio

[73] Assignee: The General Tire & Rubber Company, Akron, Ohio

[21] Appl. No.: 872,842

[22] Filed: Jan. 26, 1978

Related U.S. Application Data

[63] Continuation of Ser. No. 703,154, Jul. 7, 1976, abandoned.

[51] Int. Cl.$^2$ .......................... C08L 9/00; C08L 39/08
[52] U.S. Cl. .............................. 260/29.3; 156/110 A; 260/29.7 NR
[58] Field of Search .................. 260/29.3, 29.7 NR; 156/110 A

[56] References Cited

U.S. PATENT DOCUMENTS

| 2,817,616 | 12/1957 | Wolfe | 152/330 R |
| 3,867,328 | 2/1975 | Fahey | 260/29.3 |
| 3,895,163 | 7/1975 | Elmer | 156/110 A |
| 3,930,095 | 12/1975 | van Gils et al. | 156/110 A |

OTHER PUBLICATIONS

Encyclopedia of Polymer Science & Technology, vol. 8, Interscience, N.Y., p. 166.

*Primary Examiner*—M. J. Welsh

[57] ABSTRACT

An alkaline aqueous emulsion of a rubbery vinyl pyridine copolymer is stabilized by the presence of a minor amount by weight of a resorcinol-formaldehyde novolak wherein said emulsion is free of soaps added after the polymerization of the copolymer. High H-adhesions are obtained with cord dips made using the stabilized emulsion.

1 Claim, No Drawings

VINYL PYRIDINE LATEX STABILIZED WITH A RESORCINOL-FORMALDEHYDE NOVOLAK

This is a continuation of application Ser. No. 703,154 filed July 7, 1976, and now abandoned.

BACKGROUND OF THE INVENTION

1. Field of the Invention

This invention is the stabilization of vinyl pyridine latex emulsions by the addition of a resorcinolformaldehyde novolak to prevent coagulation caused by mechanical shear.

2. Description of the Prior Art

Various soaps such as alkali metal soaps have historically been used to stabilize vinyl pyridine latex against coagulation caused by mechanical shear. Vinyl pyridine latex has been used extensively in tire cord dips. Prior to use, the vinyl pyridine latex is mixed with a resin forming agent such as resorcinol or a resorcinolformaldehyde novolak, and formaldehyde or a resorcinolformaldehyde resole.

While the soaps used have been very effective in stabilizing the latex against coagulation caused by shear, there have been drawbacks caused by the use of soap stabilizers. For instance, the alkali metal ions of the soap have caused weakening of polyester cord used as a reinforcement in tires. There is also the possibility that during the use of a tire, the soap, which at one time was used as a stabilizer, may migrate to an interface within tire. Collection of soap at an interface could possibly cause separation of the rubber components at that interface. The soaps used also have caused the vinyl pyridine latex cord dips to foam during use. This foaming causes nonuniformity both in the amount of dip applied to a cord, and in the integrity of the coating of the dip on the surface of the cord. Another drawback on the use of soap as stabilizers in vinyl pyridine latex has been the bacterial attack on these latexes unless bactericide is added.

SUMMARY OF THE INVENTION

The present invention is directed to the use of the resorcinol-formaldehyde novolak, normally used as a compounding ingredient for tire cord dips to stabilize the vinyl pyridine latex. Vinyl pyridine latexes containing resorcinol-formaldehyde novolaks compare quite favorably in shear stability with vinyl pyridine latexes stabilized with soap. When one desires to use the vinyl pyridine latex stabilized with a resorcinol-formaldehyde novolak, it is only necessary that formaldehyde, phenol formaldehyde resole or resorcinol-formaldehyde resole or mixtures thereof be added to the vinyl pyridine latex composition and aged. The present invention eliminates the necessity for adding a soap to post-stabilize the vinyl pyridine latex, eliminates the damage done by the alkaline metal ions of the soap upon cord such as polyester that can cause separation of the tire components at that interface. In addition, the resorcinol-formaldehyde novolak stabilizers of the present invention help to prevent the bacterial attack on the vinyl pyridine latexes and also help to prevent the excessive foaming and the resulting problems caused by the presence of soaps in the latexes.

DESCRIPTION OF THE PREFERRED EMBODIMENTS

The shear stabilized compositions of the present invention which are useful in the manufacture of the adhesive for adhering reinforcing cord to rubber comprise an alkaline latex containing from about 10% to 50% by weight of a mixture of a major amount by weight of a rubbery vinyl pyridine copolymer and a minor amount by weight of an emulsion stabilizer consisting essentially of an acid condensed resin of resorcinol and formaldehyde, said emulsion being free of stabilizing soaps added after polymerization of the copolymer. Preferably, from about 15% to 45% by weight (as dry solids) of the latex is a mixture of a rubbery vinyl pyridine copolymer and a substantially nonheat reactable acid catalyzed resorcinolformaldehyde resin, the parts by weight ratio (dry) of said copolymer to said resin being from about 100:1 and 100:10, said emulsion being free of stabilizer soap compositions added to the copolymer after the polymerization of the copolymer.

Water is used in an amount sufficient to provide for the desired dispersion of the vinyl pyridine latex and for the solution of the resorcinol-formaldehyde novolak. The amounts of water present can range from 100 to 900 parts per 100 parts of solids.

Effectiveness of the stabilized vinyl pyridine latexes of the present invention is determined by the addition of resorcinol-formaldehyde resoles, phenolformaldehyde resoles, formaldehyde or mixtures thereof to formulate a series of adhesive cord dips.

The type of rubber emulsion of latex preferably used in the tire cord dip bath of this invention is a latex of a copolymer of a vinyl pyridine and a conjugated diolefin having 4 to 6 carbon atoms. The rubber latex comprises an aqueous emulsion or dispersion of a copolymer of 50 to 98 percent by weight of a conjugated diolefin having 4 to 6 carbon atoms, 2 to 40 percent of a vinyl pyridine and 0 and 48 percent of a styrene with the further qualification that the percentages of the three components add up to 100 percent. Examples of suitable vinyl pyridines are 2-vinyl pyridine, 4-vinyl pyridine, 2-methyl-5-vinyl pyridine and 5-ethyl-2-vinyl pyridine.

In practicing the present invention, it is usually preferred to use an emulsion or latex of a copolymer of from about 60 to 90 percent by weight of 1,3-butadiene, 0 to 32 percent styrene and 3 to 22 percent of 2-vinyl pyridine with the further qualification that the percentages of the three components add up to 100%. Excellent results are obtained using a latex of a terpolymer of about 70 percent by weight of 1,3-butadiene, 15 percent styrene and 15 percent 2-vinyl pyridine having a total solids content of around 30 to 50 percent by weight. More preferably blends of latexes may be used such as a blend of a 1,3-butadiene/2-vinyl pyridne rubbery copolymer latex and a 1,3-butadiene/styrene rubbery copolymer latex or a blend of a 1,3-butadiene/styrene/2-vinyl pyridine rubbery copolymer latex and a 1,3-butadiene-styrene rubbery copolymer latex so long as the parts and percent by weight ratio of total monomers in the copolymers is within the ranges as specified above. The pH of the latexes should be similar and the surfactants and stabilizers should be compatible to avoid coagulation on blending or mixing of the latexes. The amounts of polymerization ingredients and the polymerization conditions to use are well known to the art. See "Vinyl and Related Polymers," Schildknecht, John Wiley & Sons, Inc., New York, 1952; "Synthetic Rubber," Whitby, Davis & Dunbrook, John Wiley & Sons, Inc., New York, 1954; and "Emulsion Polymerization," Bovey, Kolthoff, Medalia and Meehan, Interscience Publishers, Inc., New York, 1955. Emulsions or latexes of rubbery vinyl pyridine copolymers for use in cord dips are shown by U.S. Pat. Nos. 2,561,215, 2,615,826 and 3,437,122.

In order to provide data for the tire cord adhesive of this invention, a standard single-cord H-pull test is employed to determine the static adhesion at room temperature and above of the adhesive-coated tire cord to rubber. All the data submitted herein including the examples which follow are based upon identical test conditions, and all test specimens are prepared and tested in the same way generally in accordance with ASTM Designation: D 2138-67.

In order to apply the adhesive dip to the cords in a reliable manner, the cords are fed through the adhesive dip bath containing the rubber and the phenolic composition and into a drying oven where they are dried. In each case the adhesive-coated cords leaving the dip are dried in the oven at from about 300 to 500° F., or at a temperature below the temperature at which the fibers of the cord would lose their tensile strength, for from about 30 – 300 seconds or so or at least for a period of time sufficient to allow wetting of the cord and penetration of the fibers of the cord by the adhesive mixture.

The H-adhesion test referred to above measures the static adhesion of the dried adhesive coated fibers to cured rubber.

In each case the rubber test specimens are made from one of three standard type rubber compositions using the following three recipes:

| Stock A | Parts By Weight |
|---|---|
| Natural Rubber | 50 |
| Butadiene-styrene rubbery copolymer average 23.5% bound styrene, SBR-1502, emulsion polymerized | 50 |
| High abrasion furnace carbon black | 35 |
| "Endor", activated zinc salt of pentachloro - thiophenol, peptizing agent, duPont | 0.65 |
| "Circosol" 2XH, napthenic type oil Sun Oil Company | 7.0 |
| Zinc Oxide | 3.0 |
| Stearic Acid | 1.0 |
| "AgeRite Spar", a mixture of mono-, di- and tri-styrenated phenols, antioxidant, R. T. Vanderbilt Co., Inc. | 1.0 |
| "Picco 100", alkyl aromatic polyindene resin, reinforcing and processing oil, Pennsylvania Industrial Chemical Corp. | 2.0 |
| Diphenylguanidine | 0.5 |
| N-Oxydiethylene benzothiazole-2-sulfenamide | 0.9 |
| Sulfur (insoluble) | 2.6 |
| Petroleum oil (in sulfur) | 0.65 |
| Stock B | Parts By Weight |
| Natural Rubber | 46.64 |
| Butadiene-styrene rubbery copolymer, average 23.5% bound styrene, SBR-1500, emulsion polymerized | 38.5 |
| Polybutadiene, solution polymerized BD, about 93% cis-1,4, Raw Mooney ML-4 at 212° F. about 40-50 | 15.0 |
| Carbon black, fast extrusion furnace | 45.0 |
| Hydrated silica, "Hi-Sil" 233, PPG Industries, Inc. | 15.0 |
| "BLE" 25 antioxidant, a high temperature reaction product of diphenylamine and acetone, Naugatuck Chemical Division of Uniroyal | 2.0 |
| Processing oil, a blend of highly aromatic petroleum fractions | 5.0 |
| Zinc oxide | 3.0 |
| Stearic acid | 1.5 |
| "Cohedur" RL, a 1:1 mixture of resorcinol and "Cohedur" A (the pentamethyl ether of hexamethylol melamine) which is a colorless, viscous liquid which liberates formaldehyde on heating. Naftone, Inc. | 4.7 |
| N-tert-butyl-2-benzothiazole-sulfenamide "Santocure" NS, Monsanto Chemical Co. | 1.2 |
| Sulfur | 3.0 |
| Stock C | Parts By Weight |
| Natural Rubber (No. 3 Smoked Sheet) | 36.50 |
| Butadiene-styrene rubbery copolymer, average 23.5% bound styrene, emulsion polymerized | 43.50 |
| Polybutadiene (solution polymerized BD, about 93% cis-1,4, Raw Mooney ML-4 at 212° F. about 40–50) | 20.00 |
| Carbon black, fast extrusion furnace | 35.00 |
| Carbon black, high abrasion furnace (high structure) | 35.00 |
| Alkyl aromatic polyindene resin, reinforcing and processing aid, Picco 100, Pennsylvania Industrial Chemical Corp. | 4.5 |
| Naphthenic oil, Circosol type 2XH, Sun Oil Company | 32.80 |
| Zinc Oxide | 3.8 |
| Stearic Acid | 1.5 |
| Mixture of mono, di and tristyrenated phenols, AgeRite Spar, R. T. Vanderbilt Co. Inc. antioxidant | 1.2 |
| Benzothiazyl disulfide, Altax, R. T. Vanderbilt Co., Inc., accelerator | 1.2 |
| Tetramethyl thiuram monosulfide, active ingredient Thiohex accelerator, E. I. DuPont de Nemours & Co., Inc. | 0.1 |
| Crystex, about 80% insoluble sulfur & 20% petroleum oil, Stauffer Chemical Company | 3.0 |

In every case the cords to be tested are placed in parallel positions in a multiple-strand mold of the type described in the single cord H-pull adhesion test designated ASTM D 2138-67, the mold is filled with unvulcanized rubber of the above composition, the cords being maintained under a tension of 50 grams each, and the rubber is cured 20 minutes at around 121° C. to the elastic state. Each rubber test specimen is 0.63 cm thick and has a 0.95 cm cord embedment.

After the rubber has been cured, the hot reticulate cured rubber piece is removed from the mold, cooled and H-test specimens are cut from said piece, each specimen consisting of a single cord encased in rubber and having each end embedded in the center of a rubber tab or embedment having a length of 2.54 cm. The specimens are then aged at least 16 hours at room temperature. The force required to separate the cord from the rubber is then determined at room temperature or 121° C. using an INSTRON tester provided with specimen grips at a crosshead speed of 15.2 cm per minute. The force in Newtons required to separate the cord from the rubber is the H-adhesion value.

The latex surface tension measurements were made using a Cenco Tensiometer. The test is a standard test and involves drawing a ring through the surface of a latex. The tension at the time the surface film breaks is measured. The measurements were taken at 25° C.

The latex foaming characteristics were measured by adding 70 ml of water and 200 ml of latex to a Waring blender. The blender is set on high and a rheostat control on the blender is set at 100 with 140 being a maximum setting. The mixture is foamed by operating the blender for one minute. The foam levels are then measured at the designated dwell times.

The viscosity measurements were made using a Brookfield Viscometer Model LVT. The latex was held at 25° C for the test. A No. 1 spindle at 60 rpm for one minute was used in the test.

The mechanical stability of the latex was measured using a Hamilton Beach Drinkmaster No. 3 blender. A 150 ml sample of the latex at 22° C was placed in the blender, the blender sealed and run at low speed for thirty minutes.

The latex is filtered through a 100 mesh stainless steel screen.

The residue collected is dried at 105° C to a constant weight and weighed.

The test for the bactericidial effect was run by adding a bacterial culture derived from spoiled vinyl pyridine latex. One ml of innoculant (3 million count) was added to 500 ml of latex. The samples were aged for 24 hours at room temperature and then plated to get a count. After one week a second one ml innoculant was added to the 500 ml latex sample and the count repeated. This one week wait procedure was repeated to the sixth reinnoculation.

The resorcinol-formaldehyde novolak used in the following examples contained about 0.6 moles of formaldeh per mole of resorcinol. This included an estimated 15% unreacted resorcinol, 42½% of a compound having the formula R—CH$_2$—R where R is resorcinol and 42½% of a compound having the formula R—CH$_2$—R—CH$_2$—R.

The following examples will serve to illustrate the invention with more particularity to those skilled in the art. In these examples as elsewhere in the specification and claims parts and percentages are by weight (dry) unless otherwise indicated. R represents resorcinol and F represents formaldehyde and RF represents resorcinolformaldehyde resin in the present specification.

EXAMPLE I

A series of formulations were prepared with Penacolite[1]/vinyl pyridine latex[2] ratios of 2.5, 5.0, 7.5 and 10.0 parts Penacolite/100 parts of latex solids. The Penacolite resin was slowly added to the latex while stirring continuously with a magnetic stirrer. Some coagulum was formed in all cases. The recipes for the preparation of various samples and the amounts of coagulum formed in each case are shown in Table I. All samples were allowed to stand overnight before any testing was done.

[1] The Penacolite used throughout the examples was Penacolite R-2170 resin which is a resorcinol-formaldehyde novolak containing 15% unreacted resorcinol, 42½% R—CH$_2$—R and 42½% R—CH$_2$—R—CH$_2$—R. The mole ratio of formaldehyde to resorcinol (reacted and unreacted) has a value of 0.6:1. Penacolite resin has a pH of 3 and a total solids content of 75% and is available from the Koppers Co., Pittsburgh, Pa.
[2] A terpolymer of 70% 1,3-butadiene, 15% styrene and 15% 2-vinyl pyridine having a Mooney viscosity of 60.

TABLE I
POST-STABILIZATION OF VNYL PYRIDINE LATEX WITH PENACOLITE RESIN

| Contents in Parts by Weight | FORMULATION | | | | |
|---|---|---|---|---|---|
| | A | B | C | D | E |
| Vinyl pyridine latex (42.3% solids) | 600 | 600 | 600 | 600 | 600 |
| Penacolite resin (40% solids pH adjusted to 7.05 with NaOH) | — | 15.6 | 31.2 | 46.8 | 62.4 |
| TSC[1], % | 42.3 | 41.7 | 41.6 | 41.5 | 41.5 |
| Parts Penacolite resin/100 parts latex solids | — | 2.5 | 5.0 | 7.5 | 10.0 |
| Coagulum formed[2] (dry), parts | — | 0.8 | 1.5 | 1.9 | 2.0 |
| Physical Properties | | | | | |
| pH | 11.3 | 9.5 | 9.2 | 9.0 | 8.8 |
| Brookfield viscosity, cps | 460 | 88 | 55 | 40 | 33 |
| Surface Tension, dynes/cm | 51.0 | 53.8 | 52.2 | 51.0 | 50.4 |
| Testing | | | | | |
| Mechanical Stability, parts | 0.50 | 0.46 | 0.32 | 0.11 | 0.09 |
| Foaming Characteristics, level in C.C. at 0 min. | 650 | 605 | 545 | 510 | 500 |
| at 2 min. | 525 | 540 | 480 | 440 | 415 |
| at 15 min. | 345 | 365 | 335 | 310 | 305 |

[1] Total solids content
[2] Refers to the coagulum formed when Penacolite resin is added to the blowover latex while stirring

EXAMPLE II

Penacolite resin[1] (TSC = 40%, pH = 8.7) was slowly added to a vinyl pyridine latex[2] while stirring with a magnetic stirrer. Samples with Penacolite resin/latex ratios of 2.5, 5.0, 7.5 and 10.0 parts/100 parts of latex solids were thus prepared. All formulations were adjusted to 41% TSC with deionized water. Table II gives the recipes for the preparation of the above formulations. All formulations were allowed to stand at least overnight before testing.

[1] Same chemical composition as resin of Example I
[2] A terpolymer of 70% butadiene, 15% styrene and 15% vinyl pyridine having a Mooney viscosity of 45.

TABLE II
POST-STABILIZATION OF VINYL PYRIDINE LATEX WITH PENACOLITE RESIN

| Contents in parts by weight | FORMULATION | | | | |
|---|---|---|---|---|---|
| | A | B | C | D | E |
| Vinyl pyridine latex (45% solids) | 600 | 600 | 600 | 600 | 600 |
| Penacolite resin (40% solids pH adjusted to pH 8.7 with NaOH) | — | 16.9 | 33.8 | 50.7 | 67.5 |
| Deionized water | 59.0 | 58.0 | 58.0 | 57.5 | 57.5 |
| TSC, % | 41.0 | 41.0 | 41.0 | 41.0 | 41.0 |
| Part Penacolite resin/100 parts latex solids | 0.0 | 2.5 | 5.0 | 7.5 | 10.0 |
| Coagulum formed[3] | — | Nil | Nil | Nil | Nil |
| Physical Properties | | | | | |
| pH | 11.2 | 9.8 | 9.6 | 9.5 | 9.3 |
| Brookfield viscosity, cps | 80 | 25 | 16 | 14 | 14 |
| Surface Tension, dynes/cm | 54.8 | 54.1 | 52.5 | 50.9 | 49.8 |
| Testing | | | | | |
| Mechanical Stability, gm | 0.76 | 0.02 | Nil | Nil | Nil |
| Foaming Characteristics, level in C.C. at 0 min. | 620 | 600 | 590 | 580 | 570 |
| at 2 min. | 600 | 530 | 520 | 510 | 500 |
| at 15 min. | 420 | 370 | 350 | 335 | 325 |

[3] Refers to the coagulum formed when Penacolite is added to the blowover latex while stirring.

EXAMPLE III

Penacolite resin[1] (TSC = 40%, pH = 8.7) was slowly added to a vinyl pyridine latex[2] while stirring with a magnetic stirrer. No coagulum was formed. Samples were prepared with Penacolite resin/latex ratios of 2.5, 5.0, 7.5 and 10.0 parts/100 parts of latex solids. All samples were adjusted to 41% TSC with deionized water. The recipes for various samples are given in Table III. All samples were allowed to stand at least overnight before testing.

[1]Same chemical composition as resin of Example I.
[2]A terpolymer of 65½% butadiene, 23½% styrene and 11% vinyl pyridine.

TABLE III
POST-STABILIZATION OF VINYL PYRIDINE LATEX WITH PENACOLITE RESIN

| Contents in parts by weight | FORMULATION | | | | |
|---|---|---|---|---|---|
| | A | B | C | D | E |
| Vinyl pyridine latex (45% solids) | 600 | 600 | 600 | 600 | 600 |
| Penacolite resin (40% solids, pH = 8.7 adjusted with NaOH) | — | 16.9 | 33.8 | 50.7 | 67.5 |
| Deionized Water | 59.0 | 58.0 | 58.0 | 57.0 | 57.0 |
| TSC, % | 41.0 | 41.0 | 41.0 | 41.0 | 41.0 |
| Parts Penacolite resin/100 parts latex solids | — | 2.5 | 5.0 | 7.5 | 10.0 |
| Coagulum formed[3], gm | — | Nil | Nil | Nil | Nil |
| Physical Properties | | | | | |
| pH | 10.7 | 9.7 | 9.5 | 9.4 | 9.3 |
| Brookfield viscosity, cps | 47 | 21 | 15 | 15 | 15 |
| Surface Tension, dynes/cm | 53.2 | 52.2 | 50.8 | 49.5 | 48.8 |
| Testing | | | | | |
| Mechanical Stability, gm | 0.23 | Nil | Nil | Nil | Nil |
| Foaming Characteristics, level in C.C. at 0 min. | 690 | 620 | 580 | 570 | 550 |
| at 2 min. | 630 | 550 | 515 | 500 | 495 |
| at 15 min. | 410 | 370 | 360 | 350 | 340 |

[3]Refers to the coagulum formed when Penacolite is added to the blowover latex while stirring.

EXAMPLE IV

Adhesion testing was performed with vinyl pyridine latex, post-stabilized with resorcinol-formaldehyde novolak. Both resorcinol-formaldehyde type dips and the dips containing the phenol-formaldehyde resin were prepared and tested for the adhesion of rayon, nylon, Kevlar and polyester to various rubber stocks. The dip recipes are given in Table IV A along with the processing conditions for various cords.

TABLE IV A

| Contents | DIP NO. | | | |
|---|---|---|---|---|
| | 1 | 2 | 4 | 10 |
| Vinyl pyridine latex I[1] | 244 | 244 | — | — |
| Latex 2[2] (40%) | — | — | 262 | — |
| Latex 3[3] (40%) | — | — | — | 275 |
| Phenol-Formaldehyde Resin[4] (45%) | — | 33.3 | 33.3 | — |
| Resorcinol-Formaldehyde Resole (6.5%)[5] | 266 | — | — | — |
| Penacolite R-2170 (40%) | — | 12.5 | — | — |
| Formaldehyde (37%) | — | — | — | 16.2 |
| NH₄OH (28%) | 11.3 | — | — | 5.6[6] |
| NaOH (50%) | — | — | — | 0.6 |
| Deionized Water | 60.0 | 10.2 | 4.7 | 274.2 |
| TSC[7], % | 20 | 40 | 40 | 20 |

Cord Processing Conditions:
  Kevlar: 20% TSC, 238° C, 80 seconds, 2% stretch (dips 2 & 4 only)
  Nylon 66: 20% TSC, 238° C, 80 seconds, 8% stretch
  Polyester (D-417 primer): 20% TSC, 221° C, 45 seconds, 0% stretch

TABLE IV A-continued

| Contents | DIP NO. | | | |
|---|---|---|---|---|
| | 1 | 2 | 4 | 10 |

Rayon: 20% TSC, 221° C, 60 seconds, 4% stretch

[1]The latex contains 70% butadiene, 15% styrene and 15% vinyl pyridine having a Mooney of 40–50.
[2]Latex 2 is prepared by adding Penacolite to blowover Latex 1 at Pencolite/latex solids level of 5/100.
[3]Latex 3 is prepared by adding Penacolite to blowover Latex 1 at Penacolite/latex solids level of 10/100.
[4]Phenol-formaldehyde resin containing 3 moles of formaldehyde per mole of phenol.
[5]Two moles formaldehyde per mole resorcinol, reaction conditions 6 hours at 25° C 0.075 moles NaOH catalysts/mole resorcinol reaction.
[6]Added next day.
[7]Total solids content.

The H-adhesion data obtained for various cords with both the resorcinol-formaldehyde type dips and phenol formaldehyde type dips are shown in Table IV B below. The corresponding dip recipes are given in Table IV A.

a. Kevlar — The dip prepared with the latex post-stabilized with Penacolite gave adhesions (RT and 121° C) equivalent to that of the control dip.

b. Polyester (2-step) — The dips prepared with the latex post-stabilized with Penacolite gave adhesions (RT and 121° C) essentially equivalent to those of the corresponding control dips.

c. Nylon — The RF dip prepared with the latex post-stabilized with Penacolite gave lower adhesions than that of the corresponding RF control dip. The phenol-formaldehyde dip prepared with the latex post stabilized with Penacolite gave adhesions essentially equivalent to the corresponding control dip.

d. Rayon — The dips prepared with latexes post-stabilized with Penacolite gave slightly higher adhesions than those of the corresponding control dips.

TABLE IV B
H-ADHESION* DATA FOR VARIOUS CORDS

| Cord | Stock | DIP NO. | | | | | | | |
|---|---|---|---|---|---|---|---|---|---|
| | | —1 | | —2 | | —4 | | —10 | |
| | | RT | 121° C | RT | 121° C | RT | 121° C | RT | 121° C |
| Kevlar | B | — | — | 254 | 149 | 252 | 158 | — | — |
| Polyester (D-417 primer) | C | 258 | 164 | 269 | 167 | 263 | 156 | 256 | 162 |
| Nylon | A | 237 | 144 | 245 | 159 | 229 | 159 | 208 | 125 |
| Rayon | A | 234 | 123 | 253 | 150 | 269 | 178 | 259 | 167 |

*All values are in Newtons (1 Newton = 1/4.448 lbs.)

EXAMPLE V

Samples of vinyl pyridine latexes containing varying amounts of Penacolite were submitted for determination of the bactericide activity of Penacolite. The test method used determines the ability of the bactericide to reduce or eliminate bacterial growth when the latex is inoculated by bacteria.

Table V
BACTERICIDE EFFECT OF PENACOLITE R-2170 ON GEN-TAC LATEXES (40% SOLIDS)

| Example Latex Used | Parts Penacolite 100 Parts Latex Solids | 1st Initial | 1st Replated+ | 2nd Initial | 2nd Replated+ | 3rd Initial | 3rd Replated+ | 4th Initial | 4th Replated+ | 5th Initial | 5th Replated+ | 6th Initial | 6th Replated+ |
|---|---|---|---|---|---|---|---|---|---|---|---|---|---|
| 1-A Terpolymer containing | 0.0 | P1* | N | P3 | P5 | P3 | P3 | P3 | P3 | P5 | P5 | P5 | P5 |
| B 70% butadiene, 15% | 2.5 | P1 | P1 | P3 | P1 | P1 | N | P1 | P1 | P3 | P3 | P5 | P5 |
| C styrene and 15% vinyl | 5.0 | P3 | N | P1 | P1 | N | Z | P1 | P1 | P4 | P3 | P5 | P5 |
| D pyridine, 40-50 Mooney | 7.5 | P3 | N | P1 | P1 | Z | P1 | P1 | P1 | P3 | P1 | P1 | P1 |
| E Viscosity | 10.0 | N | Z | N | N | Z | N | P1 | P1 | P5 | P5 | P5 | P5 |
| 2-A Same as above but | 0.0 | P1 | P5 | P5 | P5 | P5 | P5 | P4 | P4 | P2 | P3 | P3 | P2 |
| B 60 Mooney Viscosity | 2.5 | P1 | P5 | P5 | P5 | P1 | P1 | P1 | P1 | P4 | P4 | P5 | P5 |
| C | 5.0 | P1 | P5 | P5 | P1 | P1 | P1 | P4 | P4 | P2 | P2 | — | — |
| D | 7.5 | P1 | N | P1 | N | P1 | P1 | P1 | P1 | P2 | N | — | — |
| E | 10.0 | N | Z | P1 | N | N | Z | P5 | P5 | P3 | P2 | P3 | P3 |
| 3-A Terpolymer containing | 0.0 | P1 | P1 | P1 | P1 | P3 | P4 | P1 | P1 | P4 | P2 | P4 | P3 |
| B 65½% butadiene, 23⅓% | 2.5 | P1 | P3 | P1 | P1 | P1 | P1 | P3 | P3 | P3 | P2 | P5 | P3 |
| C styrene and 11% vinyl | 5.0 | P1 | P3 | P1 | P1 | Z | Z | P5 | P5 | P5 | P5 | P5 | P3 |
| D pyridine | 7.5 | P1 | N | P1 | N | Z | Z | P5 | P5 | P2 | P1 | P3 | P2 |
| E | 10.0 | N | Z | Z | N | Z | Z | P1 | P1 | P2 | P1 | P3 | — |
| Number of bacteria in inoculum/ml | | 2.3 × 10⁶ | | — | | 1.6 × 10⁶ | | 2.1 × 10⁶ | | 4.2 × 10⁵ | | 1.7 × 10⁶ | |

*Results recorded as:
N - No bacterial growth - very good protection
P1 - Good protection
P2 - Fair
P3 - Fair-Poor
P4 - Poor
P5 - Very poor protection
+Sample replated to determine if extra time is needed to kill bacteria In addition to recited post additive resorcinolformaldehyde novolak other post additives can be added after the vinyl pyridine latex is formed. These include shortstoppers such as hydroquinone, various known freeze thaw stabilizers, and other bactericides.

Latex of the present invention can be used to make adhesive containing reinforcing elements which can be adhered to a vulcanizable blend of natural rubber, polybutadiene rubber, and rubbery butadiene-styrene copolymer by curing the same in combination together. It is apparent that said adhesive containing reinforcing element can be adhered to other vulcanizable rubbery materials by curing or vulcanizing the same in combination with the rubber, such as one or more of the foregoing rubbers as well as nitrile rubbers, chloroprene rubbers, polyisoprenes vinyl pyridine rubbers, acrylic rubbers, isoprene-acrylonitrile rubbers and the like and mixtures of the same. These rubbers prior to curing can be mixed with the usual compounding ingredients including sulfur, stearic acid, zinc oxide, magnesium oxide, accelerators, antioxidants, antiozonants and other curatives and the like well known to those skilled in the art for the particular rubbers being employed.

Fibers, yarns, filaments, cords or fabric and the like coated with adhesives made from the latex of the present invention can have from about 3 to 7% by weight (dry) total solids from the adhesive dip on the cord based on the weight of the cord and can be used in the manufacture of radial, bias, or belted-bias passenger tires, truck tires, motorcycle and bicycle tires, off-the-road tires, airplane tires, transmission belts, V-belts, conveyor belts, hose, gaskets, rubbers, tarpaulins, and the like.

We claim:

1. In a shear and storage stable composition, useful in the manufacture of an adhesive for adhering reinforcing cord to rubber, consisting essentially of an alkaline latex of from about 15 to 45% by weight of a mixture of a rubbery vinyl pyridine copolymer and a shear and storage stabilizer, the parts by weight ratio of said copolymer to said stabilizer being from about 100:1 to 100:10, said emulsion being free of stabilizer soap compositions added to the copolymer after the polymerization of the copolymer, wherein the improvement comprises the stabilizer comprising a substantially nonheat reactable acid catalyzed resorcinol formaldehyde resin.

* * * * *